United States Patent
Bhuyan

(10) Patent No.: US 11,436,715 B2
(45) Date of Patent: Sep. 6, 2022

(54) IMAGE BRAND RANKING

(71) Applicant: Intuit Inc., Mountain View, CA (US)

(72) Inventor: Ranadeep Bhuyan, Bangalore (IN)

(73) Assignee: Intuit Inc.

( * ) Notice: Subject to any disclaimer, the term of this patent is extended or adjusted under 35 U.S.C. 154(b) by 163 days.

(21) Appl. No.: 17/107,916

(22) Filed: Nov. 30, 2020

(65) Prior Publication Data
US 2022/0172339 A1    Jun. 2, 2022

(51) Int. Cl.
*G06K 9/00* (2022.01)
*G06T 7/00* (2017.01)
*G06N 3/08* (2006.01)
*G06Q 30/06* (2012.01)

(52) U.S. Cl.
CPC .............. *G06T 7/0002* (2013.01); *G06N 3/08* (2013.01); *G06Q 30/0631* (2013.01); *G06T 2207/20081* (2013.01); *G06T 2207/20084* (2013.01); *G06T 2207/30168* (2013.01)

(58) Field of Classification Search
CPC ......... G06T 7/0002; G06T 2207/20081; G06T 2207/20084; G06T 2207/30168; G06N 3/08; G06Q 30/0631

USPC ......................................................... 382/157
See application file for complete search history.

(56) References Cited

U.S. PATENT DOCUMENTS

2022/0207274 A1\* 6/2022 Folkens ................. G06K 9/628

OTHER PUBLICATIONS

Romaniuk, Michal and Budek, Konrad, Logo detection and brand visibility analytics—example, Aug. 29, 2019, deepsense.ai, pp. 1-12. (Year: 2019).\*

\* cited by examiner

*Primary Examiner* — Jonathan S Lee
(74) *Attorney, Agent, or Firm* — Ferguson Braswell Fraser Kubasta PC

(57) ABSTRACT

A method ranks image brands. An image brand model is trained to generate an image brand rank from image features. An augmented image brand model is trained to generate an augmented image brand rank from the image brand rank. Predicted financial features are generated from the augmented image brand rank using a feature generation model. A neural network model is trained to generate a predicted augmented image brand rank from the predicted financial features.

20 Claims, 10 Drawing Sheets

Process 200

IMAGE BRAND RANKING

BACKGROUND

Business entities have images (logos, profile images, etc.) that may identify the brands of the business entities. Business entities also have financial data that can be used to determine the relative ranks between business entities. A challenge is to identify the relative ranks between the images of business entities and to relate the quality of an image with the brand value of the business.

SUMMARY

In general, in one or more aspects, the disclosure relates to a method of training machine learning models to generate image brand ranks. An image brand model is trained to generate an image brand rank from image features. An augmented image brand model is trained to generate an augmented image brand rank from the image brand rank. Predicted financial features are generated from the augmented image brand rank using a feature generation model. A neural network model is trained to generate a predicted augmented image brand rank from the predicted financial features.

In general, in one or more aspects, the disclosure relates to a system comprising one or more processors, one or more memories, a training application, and a server application. The training application is stored on the one or more memories, executes on the one or more processors, and is configured for: training an image brand model to generate an image brand rank from image features, training an augmented image brand model to generate an augmented image brand rank from the image brand rank, generating predicted financial features from the augmented image brand rank using a feature generation model, and training a neural network model to generate a predicted augmented image brand rank from the predicted financial features. The server application is stored on the one or more memories, executes on the one or more processors, and is configured for: generating, with a recommendation engine, a recommendation from image data using a machine learning model that includes the neural network model, and presenting the recommendation to a client device.

In general, in one or more aspects, the disclosure relates to a method of ranking image brands. Predicted financial features are generated from an augmented image brand rank using a feature generation model. A neural network model is trained to generate a predicted augmented image brand rank from the predicted financial features. A recommendation is generated with a recommendation engine from image data using a machine learning model that includes the neural network model. The recommendation is presented to a client device.

Other aspects of the invention will be apparent from the following description and the appended claims.

DETAILED DESCRIPTION

Figure 1A:
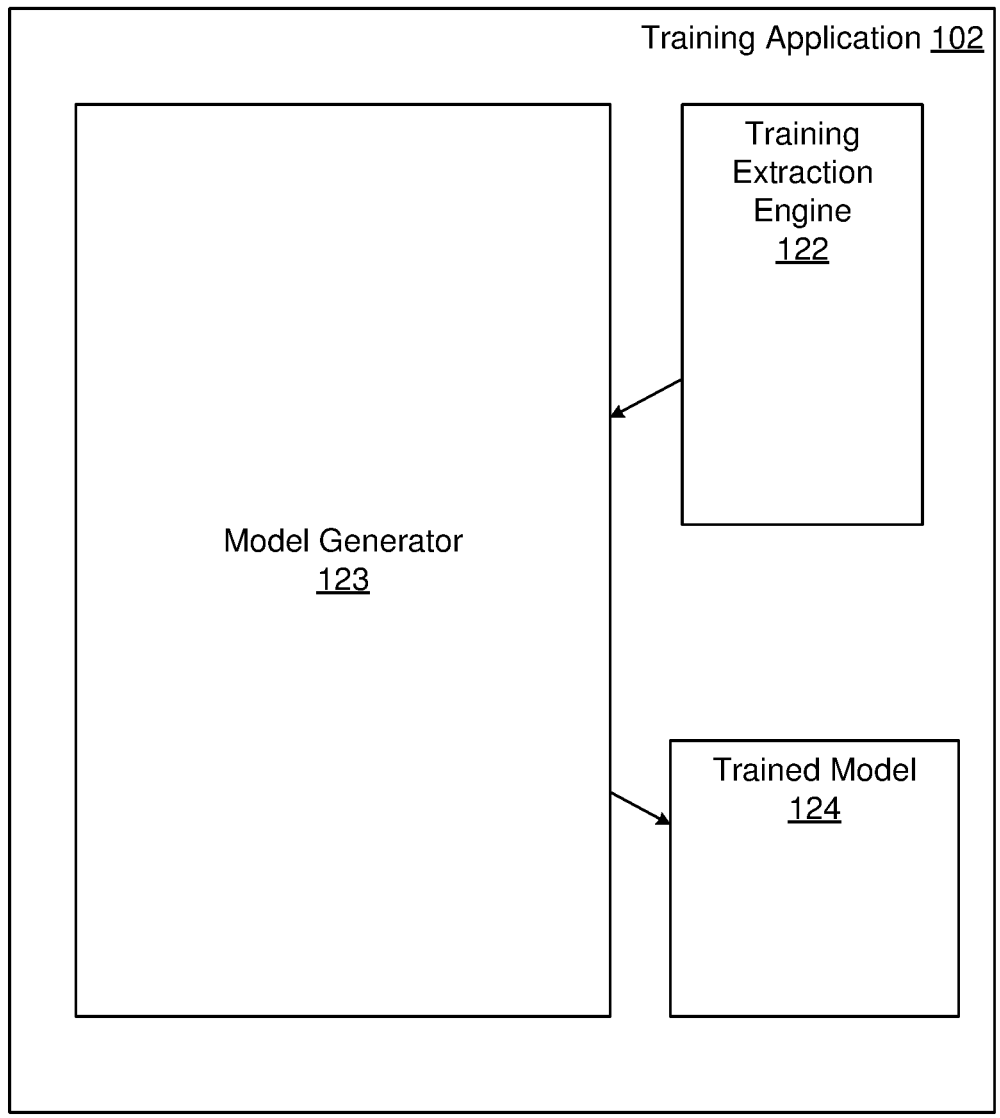
FIG. 1A, FIG. 1B, FIG. 1C, and FIG. 1D show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure train and use machine learning models to identify image brand ranks and to provide recommendations based on the ranks of images. A training application uses image data and financial data of multiple business entities to train multiple machine learning models to rank the brands of images, i.e., to generate image brand ranks. The image brand ranks correlate to the financial ranks of the financial data of business entities associated with the images. The financial ranks may be determined by a weighted combination of financial metrics derived from the financial data of the business entities. A financial brand rank model is trained to determine the rank of a financial brand (a financial brand rank) for the financial data of a business entity. An image brand rank model is trained to determine the rank of an image brand (an image brand rank) for an image of a business entity. The financial brand rank model and the image brand rank model are trained to generate similar results (i.e., similar output rank values) from different types of input (e.g., financial data for the financial brand rank model and image data for the image brand rank model). The training application trains additional machine learning models to increase the accuracy of the brand ranks. The machine learning models may include a neural network model that generates predicted image brand ranks from predicted financial features, where the predicted financial features are generated using a feature generation model that uses an augmented image brand rank as an input.

After generating the image brand ranks, a server application may use the image brand ranks to generate recommendations. Financial recommendations may be to adjust the terms of an offer to a business entity based on the image brand rank. Image recommendations may identify characteristics of an image that may be just to improve the image brand rank.

Financial data includes values that describe transactions of a business entity, including transaction volumes, transaction amounts, asset amounts, liability amounts, etc. Financial data may be periodic (daily, weekly, monthly, quarterly, yearly, etc.), average amounts, cumulative amounts, ratios, etc. Financial data may be processed to generate financial metrics and financial ratios (return on investment, quick ratio, debt to equity ratio, gross profit margin, etc.). Financial features are extracted from financial data and may include the financial data itself, financial ratios, financial metrics, combinations thereof, etc.

Financial ranks of business entities are values that identify the relative ranking between the different business entities. Financial ranks may be heuristically determined or may be generated from a weighted combination of financial features. For example, business entities with higher transaction amounts may have financial ranks that are higher than the financial ranks of business entities with lower transaction amounts.

Image data includes the raw image data, values derived from the raw image data, and metadata. Image data may include values that identify the cost of creation of an image, the type and cost of the device used to capture an image (camera, phone, etc.), the color depth of an image, the resolution of an image, the number of colors used in an image, the sharpness of an image, radius of rounded corners of an image, the rotation of an image (also referred to as a tilt of a set of pixel clusters in an image), the media type (jpg, png, svg, tif, gif, cymk, etc.), the saturation of primary color in an image, the saturation of secondary color with respect to primary color in an image, etc. Image features are extracted from image data and may include the raw image data, values derived from the image data, and metadata.

Figure 1B:
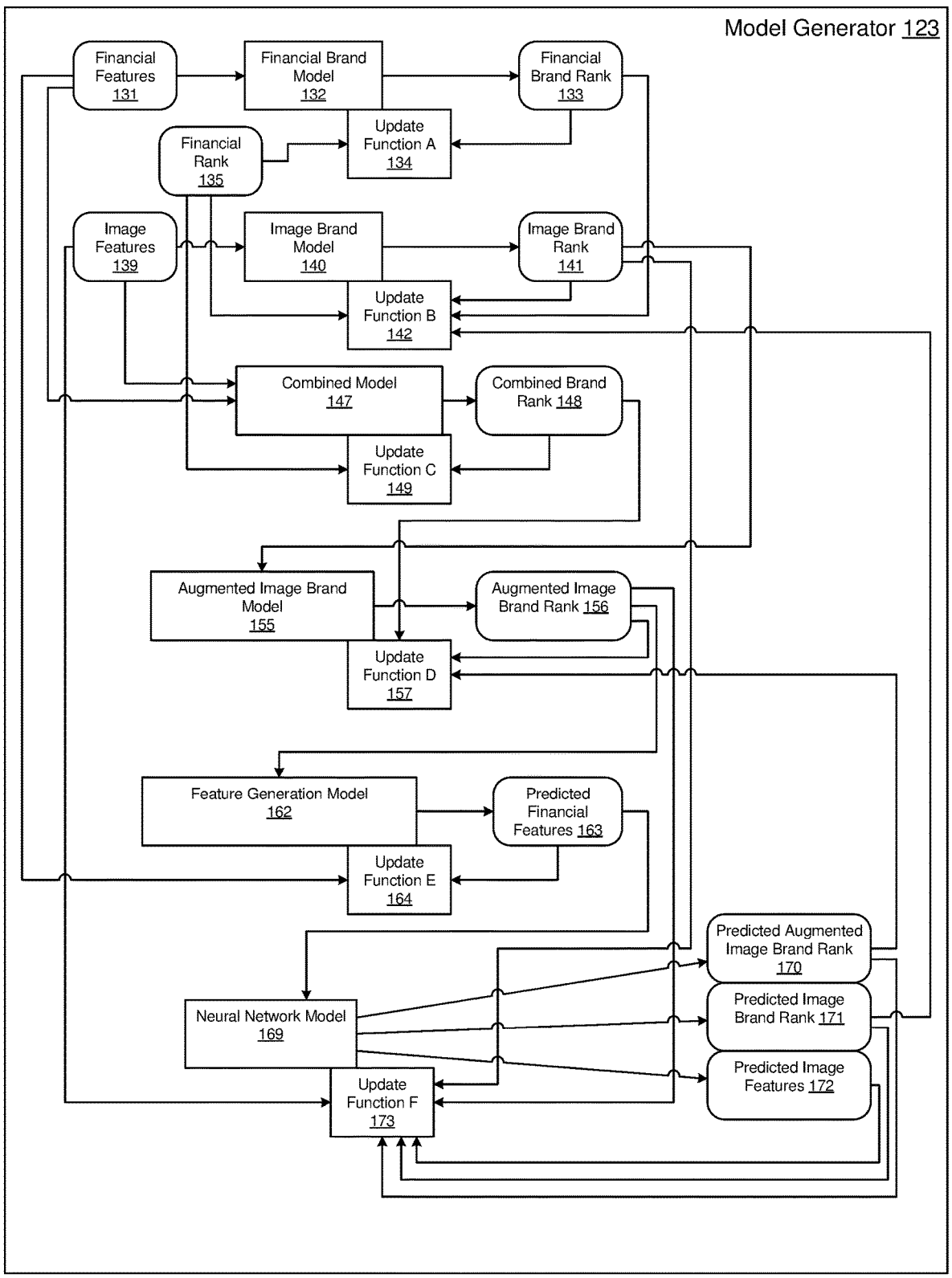
Figure 1C:
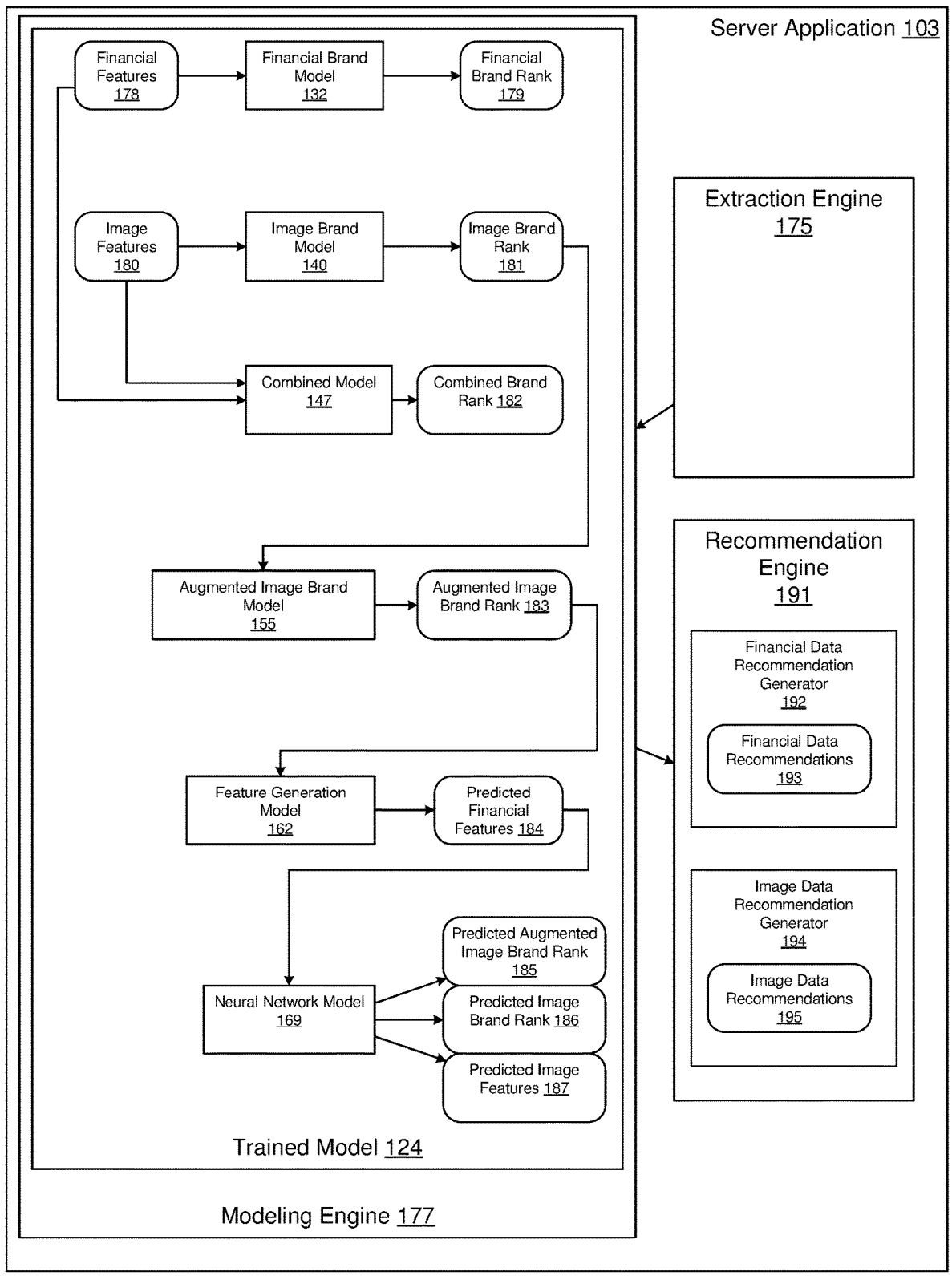
Figure 1D:
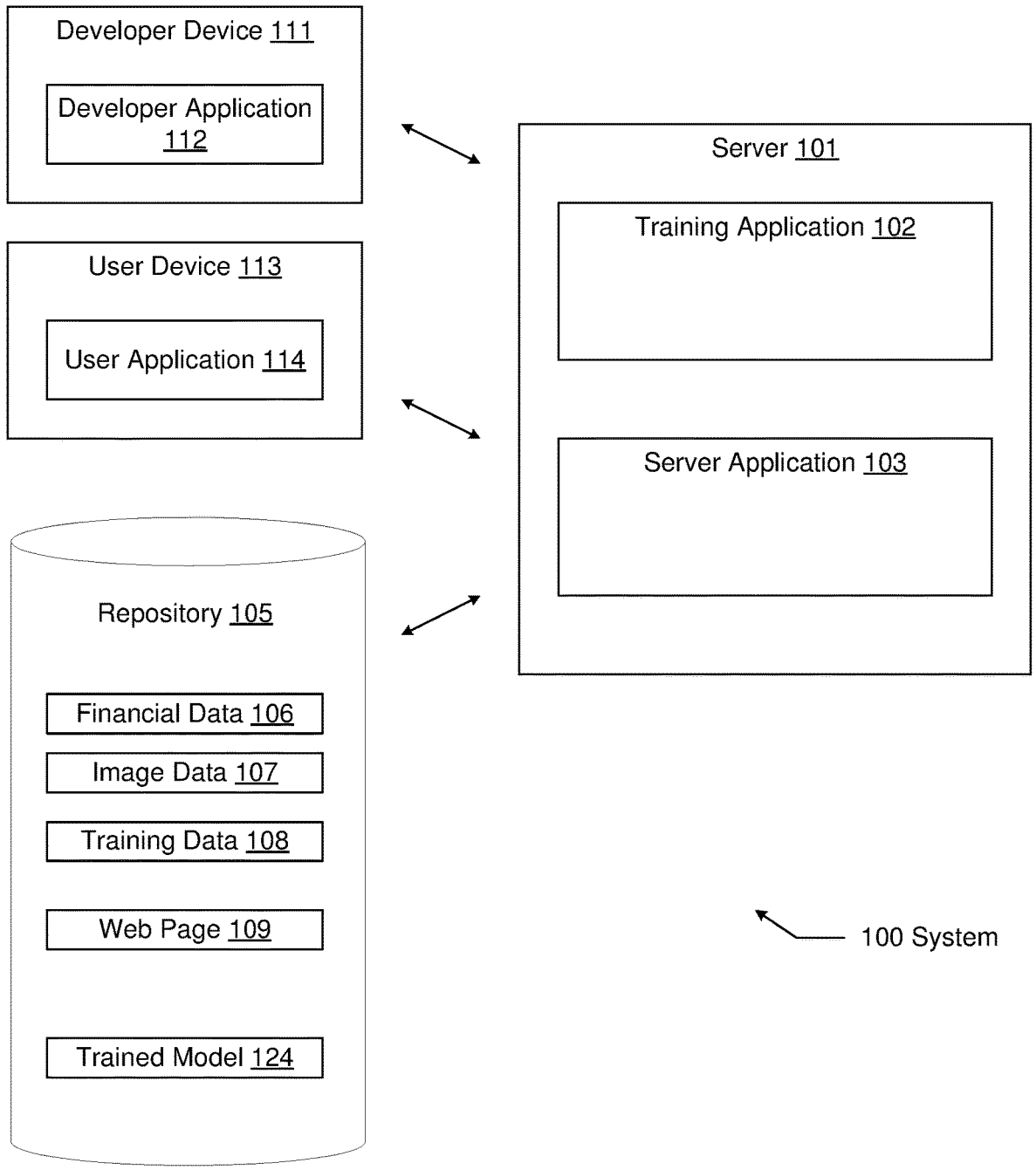

FIGS. 1A, 1B, 1C, and 1D show diagrams of embodiments that are in accordance with the disclosure. FIG. 1A shows the training application (102), which trains machine learning models to generate image brand ranks. FIG. 1B shows the model generator (123) that updates the models during training. FIG. 1C shows a server application (103) that uses the trained machine learning model (124) to generate recommendations. FIG. 1D shows a system (100), which trains and uses machine learning models to generate image brand ranks. The embodiments of FIGS. 1A, 1B, 1C, and 1D may be combined and may include or be included within the features and embodiments described in the other figures of the application. The features and elements of FIGS. 1A, 1B, 1C, and 1D are, individually and as a combination, improvements to the technology of machine learning. The various elements, systems, and components shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Turning to FIG. 1A, the training application (102) is a computer implemented program that includes the training extraction engine (122) and the model generator (123). The training application (102) generates the trained model (124) using the model generator (123) with the training extraction engine (122). The model generator (123) and the trained model (124) are further described below.

The training extraction engine (122) is a computer implemented program that retrieves the training data (108) (shown in FIG. 1D) from the repository (105) (shown in FIG. 1D) and processes the training data (108) to generate data that is input to the machine learning models of the model generator (123). The training data (108) includes historical image data (e.g., images used as logos by business entities) and historical financial data (records of transactions, financial statement data, etc.). The training extraction engine (122) may retrieve and generate the financial features (131), the financial rank (135), and the image features (139) (shown in FIG. 1B) used by the model generator (123). If a business entity has missing or incomplete financial data, industry average values may be used in place of the financial data for the business entity to generate the financial features (131) (shown in FIG. 1B).

Turning to FIG. 1B, the model generator (123) is a computer implemented program that trains multiple machine learning models that form the trained model (124) (shown in FIG. 1A and FIG. 1C). The machine learning models trained by the model generator (123) include the financial brand model (132), the image brand model (140), the combined model (147), the augmented image brand model (155), the feature generation model (162), and the neural network model (169). Each of the machine learning models receives inputs, processes the inputs to generate outputs, and is updated with an update function based on the outputs.

The financial brand model (132) generates the financial brand rank (133) from the financial features (131). The financial brand rank (133) approximates the financial rank (135) based on the financial features (131). The financial brand model (132) may be a linear regression model. In one embodiment, the financial brand model (132) uses Equation 1 below, where $R_{FB}$ is the financial brand rank (179), $a_0$ through $a_n$ are the weights of the financial brand model (132), n is the number of financial features used by the financial brand model (132), and $f_{F1}$ through $f_{Fn}$ are the financial features (131) (transaction volume, transaction size, revenue, return on investment (ROI), etc.) used by the financial brand model (132).

$$R_{FB}=a_0+a_1 \times f_{F1}+a_2 \times f_{F2}+ \ldots +a_n \times f_{Fn} \qquad (Eq.\ 1)$$

The financial features (131) are data values that may include and be derived from financial data (transaction volumes, transaction amounts, asset amounts, liability amounts, financial ratios, financial metrics, etc.) of a business entity. The financial features (131) and underlying financial data may be periodic (daily, weekly, monthly, quarterly, yearly, etc.), average amounts, cumulative amounts, ratios, etc.

The update function A (134) updates the financial brand model (132) and may use the financial brand rank (133) and the financial rank (135) to generate the updates. The update function A (134) may identify the difference (the error) between the financial brand rank (133) and the financial rank (135) and generate updates to the weights of the financial brand model (132). The weights are fed back and applied to the financial brand model (132) to reduce the error of the financial brand model (132). The error may be the mean square error, absolute error, mean percentage error, etc.

The image brand model (140) generates the image brand rank (141) from the image features (139). The image brand rank (141) also approximates the financial rank (135) but is based on the image features (139). The image brand model (140) may be a linear regression model. In one embodiment, the image brand model (140) uses Equation 2 below, where RIB is the image brand rank; $b_0$ through $b_k$ are weights, k is the number of image features used by the image brand model (140), and $f_{I1}$ through $f_{Ik}$ are image features (resolution, depth, percentage of primary color, rotation, etc.) used by the image brand model (140).

$$R_{IB}=b_0+b_1 \times f_{I1}+b_2 \times f_{I2}+ \ldots b_k \times f_{Ik} \qquad (Eq.\ 2)$$

The image features (139) are data values that may be derived from an image, e.g., a logo of a business entity. The image features (139) may include values for image depth, number of color shades used, sharpness, corner radius, rotation angle, resolution, aspect ratio, resolution times aspect ratio, media type, percentage of primary color with respect to total color, percentage of secondary color with respect to total color, file size, etc.

The update function B (142) updates the image brand model (140). In one embodiment, the update function B (142) uses the image brand rank (141), the financial rank (135), the financial brand rank (133), and the predicted image brand rank (171) to generate the updates to the image brand model (140). The update function B (142) may identify the difference (the error) between the image brand rank (141) and a combination of one or more of the financial rank (135), the financial brand rank (133), and the predicted image brand rank (171) and generate updates to the weights of the image brand model (140). The updates are fed back and applied to the image brand model (140) to reduce the error of the image brand model (140). The error may be the mean square error, absolute error, mean percentage error, etc.

The combined model (147) generates the combined brand rank (148) from the financial features (131) and the image features (139). The combined brand rank (148) also approximates the financial rank (135) and is based on both the financial features (131) and the image features (139). The combined model (147) may be a linear regression model. In one embodiment, the combined model (147) uses Equation 3 below, where $R_{CB}$ is the combined brand rank (148), $c_0$ through $c_{n+k}$ are weights, n is the number of financial features used by the combined model (147), k is the number of image features used by the combined model (147), $f_{F1}$ through $f_{Fn}$ are financial features (131) used by the combined model (147), and $f_{I1}$ through fa are the image features (139) used by the combined model (147).

$$R_{CB} = c_0 + c_1 \times f_{F1} + c_2 \times f_{F2} + \ldots + c_n \times f_{Fn} + c_{n+1} \times f_{I1} + c_{n+2} \times f_{I2} + \ldots + c_{n+k} \times f_{Ik} \quad \text{(Eq. 3)}$$

The update function C (149) updates the combined model (147) and may use the combined brand rank (148) and the financial rank (135) to generate the updates. The update function C (149) may identify the difference (the error) between the combined brand rank (148) and the financial rank (135) and generate updates to the weights of the combined model (147). The weights are fed back and applied to the combined model (147) to reduce the error of the combined model (147). The error may be the mean square error, absolute error, mean percentage error, etc.

The augmented image brand model (155) is a customized image brand model that generates the augmented image brand rank (156) from the image brand rank (141). The augmented image brand model (155) may be a polynomial regression model. In one embodiment, the augmented image brand model (155) uses Equation 4 below, where $R_{aiB}$ is the augmented image brand rank (156), Do through Dm are weights, m is the order of the polynomial, and RIB is the image brand rank (141) (e.g., from Equation 2).

$$R_{aiB} = D_0 + D_1 \times R_{IB} + D_2 \times R_{IB}^2 + D_3 \times R_{IB}^3 + \ldots + D_m \times (R_{IB})^m \quad \text{(Eq. 4)}$$

The update function D (157) updates the augmented image brand model (155) and may use the augmented image brand rank (156) and the predicted augmented image brand rank (170) to generate the updates. The update function D (157) may identify the difference (the error) between the augmented image brand rank (156) and the predicted augmented image brand rank (170) and generate updates to the weights of the augmented image brand model (155). The weights are fed back and applied to the augmented image brand model (155) to reduce the error of the augmented image brand model (155). The error may be the mean square error, absolute error, mean percentage error, etc.

The feature generation model (162) generates the predicted financial features (163) from the image brand rank (141). The feature generation model (162) may be regression model. The regression model may be a probability distribution model and may use a normalized linear regression. In one embodiment, the feature generation model (162) is a Bayesian linear regression model. The feature generation model (162) may generate data values (the predicted financial features (163)) that conform to mean and standard deviation values from the financial features (131). As an example, with a lake of test data points having image brand parameters mapped to financial parameters, Bayesian linear regression may be used where the values output from the feature generation model (162) are generated from a probability distribution instead of a single point (e.g., the single point being the mean or a "best data" point closest to the mean).

The update function E (164) updates the feature generation model (162) and may use the predicted financial features (163) and the financial features (131) to generate the updates. The update function E (164) may be an ordinary least square or other loss function that changes the parameters in the financial model. For example, the models (132), (140), (147), (155) and (162) may be treated as a single model with the inputs being the financial features (131) and the outputs being the predicted financial features (163). The update function E (164) is a loss function that may re-adjust the input parameters (i.e., the financial features (131)) to train and improve the accuracy of the feature generation model (162).

The neural network model (169) generates the predicted augmented image brand rank (170), the predicted image brand rank (171), and the predicted image features (172) from the predicted financial features (163). The neural network model (169) may include multiple layers between the inputs and outputs of the neural network model (169). The layers of the neural network model (169) may be convolutional layers, recurrent layers, fully connected layers, etc. In one embodiment, the neural network model (169) includes a sequence of layers with outputs from one of the layers forming the predicted augmented image brand rank (170), outputs from a different layer forming the predicted image brand rank (171), and outputs from another layer forming the predicted image features (172). In one embodiment, the neural network model (169) includes three fully connected layers between an input layer (that receives the inputs) and an output layer (that provides the outputs) of the neural network model (169).

The update function F (173) updates the neural network model (169) and may use the predicted augmented image brand rank (170), the predicted image brand rank (171), the predicted image features (172), the augmented image brand rank (156), the image brand rank (141), and the image features (139), to generate the updates. The update function F (173) may identify the differences (the errors) between the predicted augmented image brand rank (170) and the augmented image brand rank (156), between the predicted image brand rank (171) and the image brand rank (141), and between the predicted image features (172) and the image features (139). The update function F (173) may use the differences to generate updates to the weights of the neural network model (169) using backpropagation. The weights are fed back and applied to the neural network model (169) to reduce the error of the neural network model (169).

Turning to FIG. 1C, the server application (103) is a computer implemented program that includes the extraction engine (175), the modeling engine (177), and the recommendation engine (191). The server application (103) uses the trained model (124) of the modeling engine (177) to generate recommendations with the recommendation engine (191) from data extracted with the extraction engine (175).

The extraction engine (175) is a computer implemented program that retrieves the financial data (106) and the image data (107) (shown in FIG. 1D) from the repository (105) (shown in FIG. 1D) and processes the financial data (106) and the image data (107) to generate the data input to the trained model (124) of the modeling engine (177). The extraction engine (175) may retrieve and generate the financial features (178) and the image features (180) used by the modeling engine (177). If a business entity has missing or incomplete financial data, industry average values may be used in place of the financial data for the business entity to generate the financial features (178).

The modeling engine (177) is a computer implemented program that loads and operates the trained model (124) from the repository (105) (shown in FIG. 1D). The modeling engine (177) inputs the features (generated by the extraction engine 175) into the trained model (124) and transmits the outputs from the trained model (124) to the recommendation engine (191).

The trained model (124) includes the machine learning models trained by the training application (102). The financial brand model (132) generates the financial brand rank (179) from the financial features (178). The image brand model (140) generates the image brand rank (181) from the image features (180). The combined model (147) generates the combined brand rank (182) from the financial features (178) and the image features (180). The augmented image brand model (155) generates the augmented image brand rank (183) from the image brand rank (181). The feature generation model (162) may be a Bayesian linear regression model and generates the predicted financial features (184) from the augmented image brand rank (183). The neural network model (169) generates the predicted augmented image brand rank (185), the predicted image brand rank (186), and the predicted image features (187) from the predicted financial features (184). The modeling engine (177) receives information from the extraction engine (175), inputs the information to the trained model (124), and passes outputs from the trained model (124) to the recommendation engine (191).

The recommendation engine (191) includes the financial data recommendation generator (192) and the image data recommendation generator (194). The data passed to the recommendation engine (191) may include any of the data used by the trained model (124).

The financial data recommendation generator (192) is a computer implemented program that generates the financial data recommendations (193) with output from the trained model (124). As an example, the financial data recommendations (193) may identify a discounted interest rate for a financial product (e.g., a loan) that is offered to a business entity.

The image data recommendation generator (194) is a computer implemented program that generates the image data recommendations (195) using outputs from the trained model (124). As an example, the image data recommendations (195) may identify a feature of an image (resolution, file type, primary color percentage, etc.) to modify in order to improve the brand rank of the image and the business entity.

Turning to FIG. 1D, the system (100) is trained to perform image brand ranking using machine learning. The system (100) includes the server (101), the repository (105), the developer device (111), and the user device (113). The server (101) may include the training application (102) and the server application (103).

The training application (102) is a program on the server (101). The training application (102) trains the machine learning models of the system (100), as further described in FIG. 1A. The training application (102) may be operated or controlled by the developer device (111) with a developer application (112).

The server application (103) is a program on the server (101). The server application (103) includes multiple programs and machine learning models used by the system (100) to interact with the user device (113).

Figure 4A:
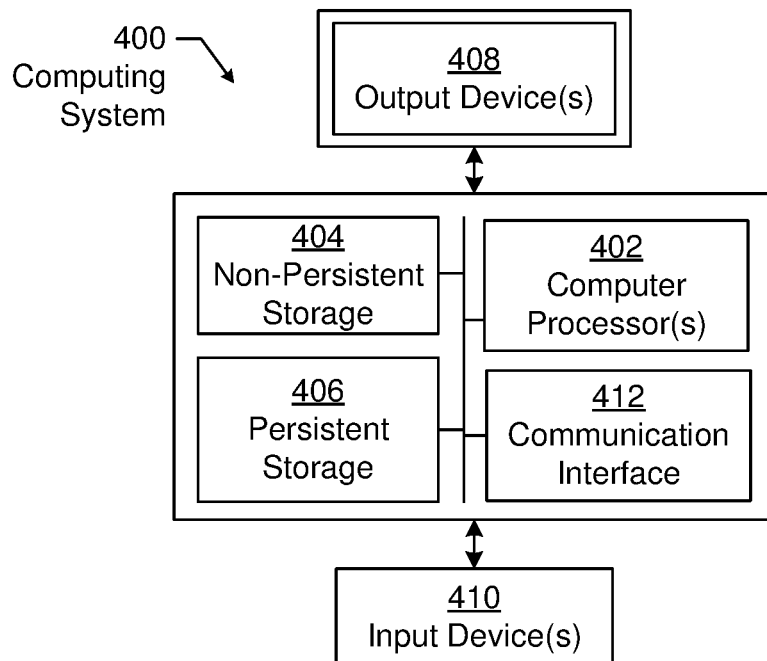
FIG. 4A and FIG. 4B show computing systems in accordance with disclosed embodiments.
Figure 4B:
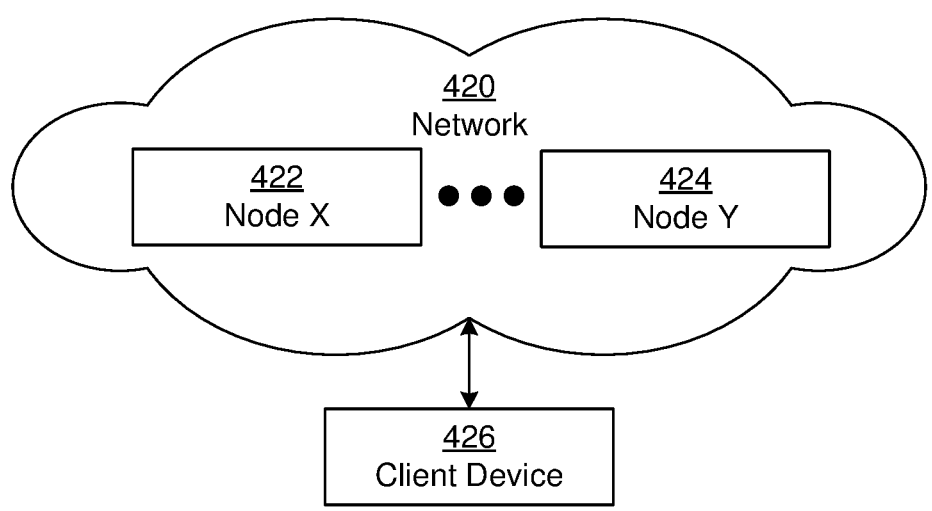

The server (101) is an embodiment of the computing system (400) and the nodes (422 and 424) of FIG. 4A and FIG. 4B. The server (101) may be one of a set of virtual machines hosted by a cloud services provider to deploy the training application (102) and the server application (103). Each of the programs running on the server (101) may execute inside one or more containers hosted by the server (101).

The repository (105) is a computing system that may include multiple computing devices in accordance with the computing system (400) and the nodes (422 and 424) described below in FIGS. 4A and 4B. The repository (105) may be hosted by a cloud services provider. The cloud services provider may provide hosting, virtualization, and data storage services as well as other cloud services and to operate and control the data, programs, and applications that store and retrieve data from the repository (105). The data in the repository (105) may include the financial data (106), the image data (107), the training data (108), the web page (109), and the trained model (124). Additionally, the repository (105) may store the inputs and outputs (e.g., the data shown in FIGS. 1B and 1n FIG. 1C) used to train and execute the machine learning models within the system (100) and the recommendations generated with the recommendation engine (191).

The financial data (106) may include the transaction records of multiple business entities. A transaction record may include values for the date, description and amount of a transaction. The financial data (106) may also include information from the balance statement, income statement, statement of cashflows, charts of accounts, etc., for multiple business entities. The financial data (106) may also include features extracted from raw financial data, including financial ratios, debt ratios, leverage ratios, return ratios, etc.

The image data (107) may include the images of multiple business entities. For example, the images may be logos of the business entities. The images may utilize different file formats, resolutions, color depths, etc. The image data (107) may also include features extracted from raw image data, including the primary color percentage, the secondary color percentage, the brightness, the contrast, etc. of the raw images.

The training data (108) includes the data that is input to an output from the machine learning models generated by the training application (102) and used by the server application (103). The training data (108) includes historical financial data and image data and may include features extracted from the financial data and image data.

The data in the repository (105) may also include a web page (109) that is part of a website hosted by the system (100) with which the users and the developers interact using the user device (113) and the developer device (111) to access the training application (102) and the server application (103).

The developer device (111) is an embodiment of the computing system (400) and the nodes (422 and 424) of FIG. 4A and FIG. 4B. In one embodiment, the developer device (111) is a desktop personal computer (PC). The developer device (111) includes the developer application (112) for accessing the training application (102). The developer application (112) may include a graphical user interface for interacting with the training application (102) to control training of the machine learning models of the system (100).

The user device (113) is an embodiment of the computing system (400) and the nodes (422 and 424) of FIG. 4A and FIG. 4B. In one embodiment, the user device (113) is a desktop personal computer (PC), a smartphone, a tablet, etc. The user device (113) is used to access the web page (109) of the website hosted by the system (100). The user device (113) includes the user application (114) for accessing the server application (103). The user application (114) may include multiple interfaces (e.g., a graphical user interface, a voice interface, etc.) for interacting with the server application (103). A user may operate the user application (114) to perform tasks with the server application (103) to interact with the system (100). The results may be presented by being displayed by the user device (113) in the user application (114).

The developer application (112) and the user application (114) may be web browsers that access the training application (102) and the server application (103) using web pages hosted by the server (101). The developer application (112) and the user application (114) may additionally be web services that communicate with the training application (102) and the server application (103) using representational state transfer application programming interfaces (RESTful APIs). Although FIG. 1D shows a client server architecture, one or more parts of the training application (102) and the server application (103) may be local applications on the developer device (111) and the user device (113) without departing from the scope of the disclosure.

Figure 2A:
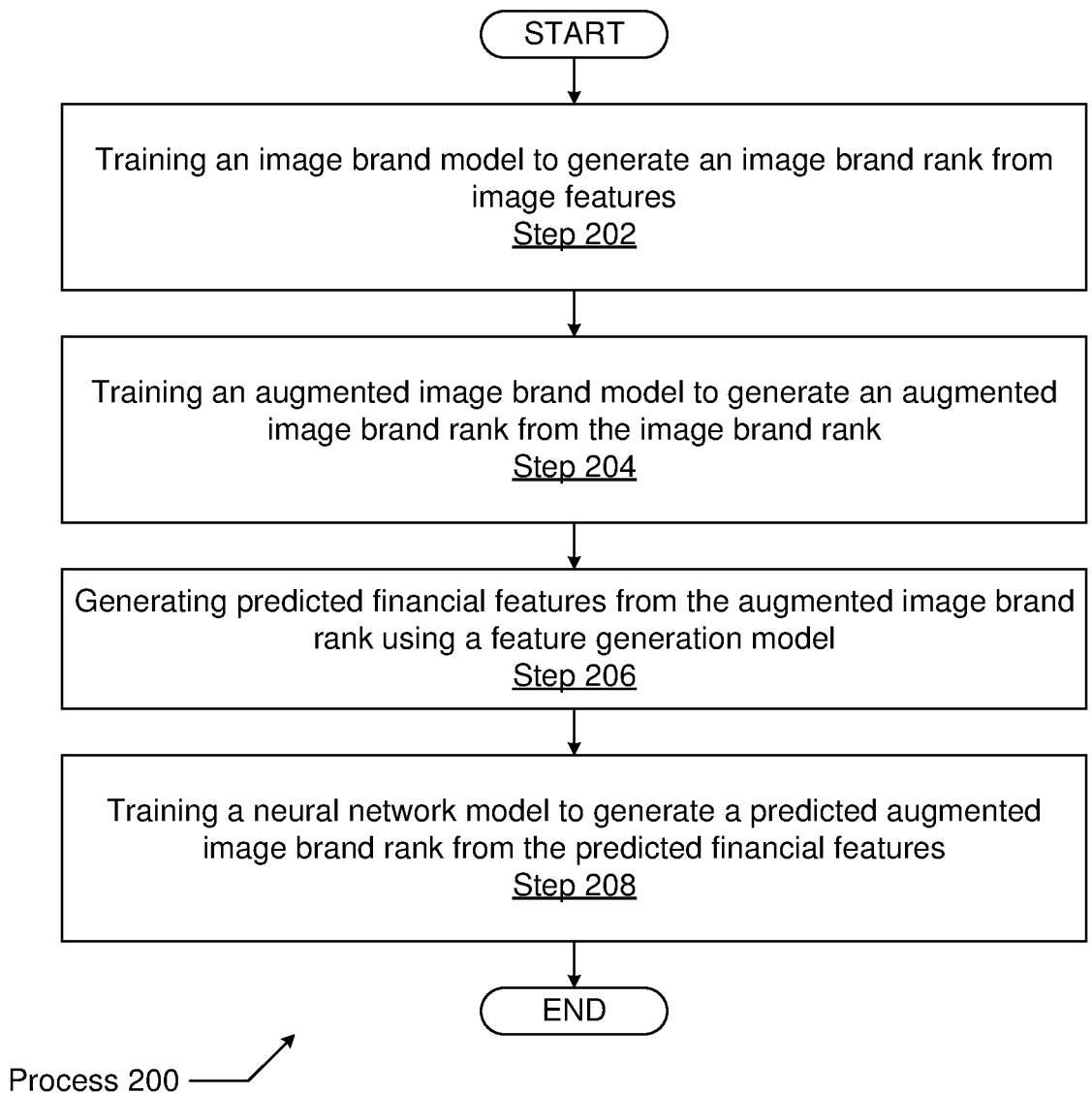
FIG. 2A and FIG. 2B show flowcharts in accordance with disclosed embodiments.
Figure 2B:
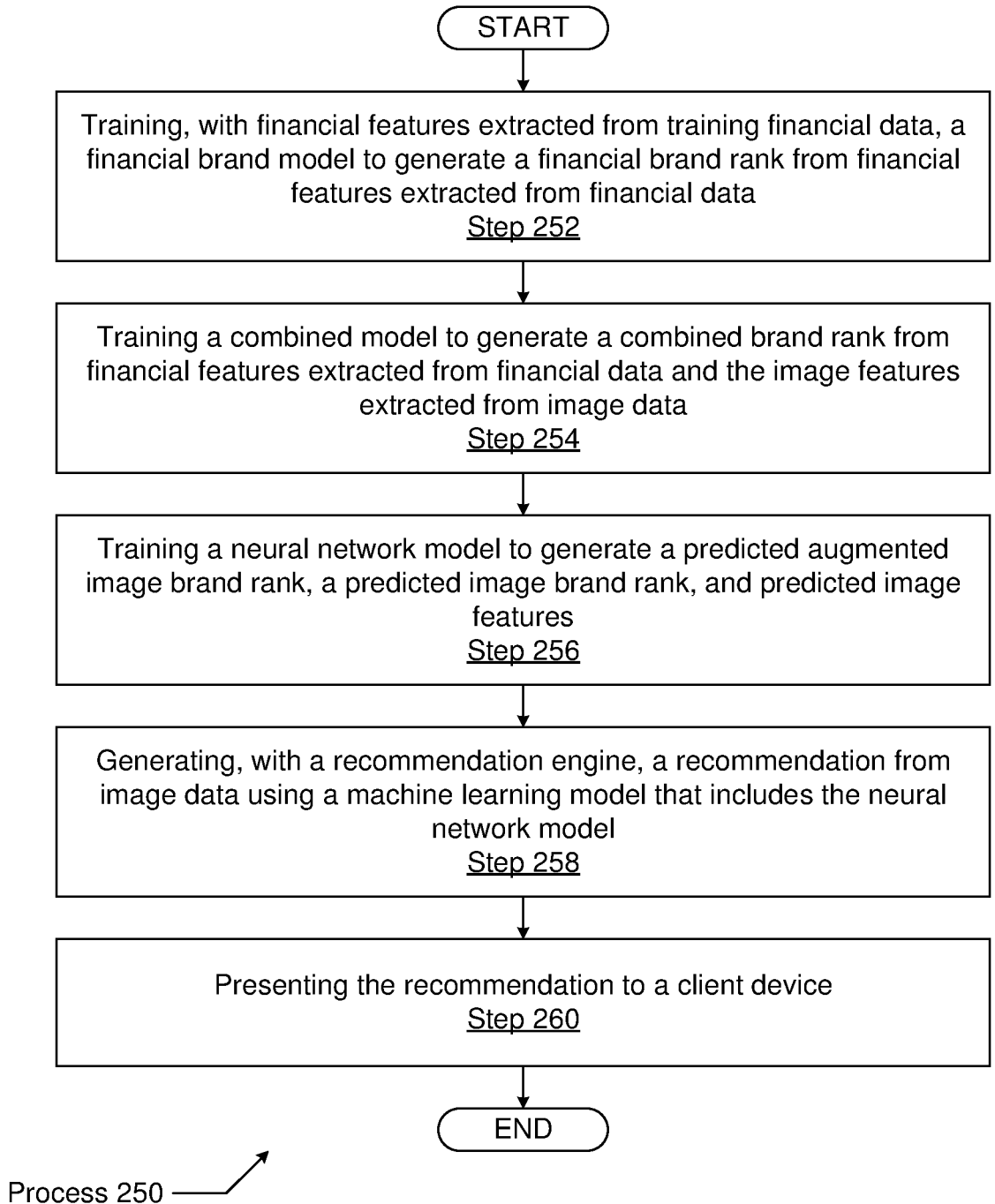

FIGS. 2A and 2B show flowcharts of processes in accordance with the disclosure. The process (200) of FIG. 2A trains machine learning models to perform image brand ranking. The process (250) of FIG. 2B trains machine learning models and generates recommendations using the trained machine learning models. The embodiments of FIGS. 2A and 2B may be combined and may include or be included within the features and embodiments described in the other figures of the application. The features of FIGS. 2A and 2B are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) may execute on a server as part of a training application and a server application. At Step 202, an image brand model is trained to generate an image brand rank from image features. The image features are extracted from an image provided to the system by a business entity and the image brand rank identifies the rank of an image of the business entity compared to the images of other business entities. A higher image brand rank may correlate to better business performance metrics identified and indicated from the financial data and features of a business entity. In one embodiment, the image brand model is updated using image brand model outputs and the financial brand model outputs. The updates may be generated by comparing the image brand model outputs and the financial brand model outputs to identify an error that is fed back to the weights of the image brand model.

At Step 204, an augmented image brand model is trained to generate an augmented image brand rank from the image brand rank. The augmented image brand rank may be generated from the image brand rank after the image brand rank is generated with the image brand model. In one embodiment, the augmented image brand model is updated using augmented image brand model outputs and the combined model outputs.

At Step 206, predicted financial features are generated from the augmented image brand rank using a feature generation model. In one embodiment, the feature generation model is a Bayesian linear regression model. The predicted financial features may be generated using the augmented image brand rank after the augmented image brand rank is generated with the augmented image brand model. In one embodiment, the feature generation model is updated using feature generation model outputs and training financial features extracted from training financial data.

At Step 208, a neural network model is trained to generate a predicted augmented image brand rank from the predicted financial features. The predicted augmented image brand rank may be generated using the predicted financial features generated with the feature generation model and may be generated with the financial features extracted from financial data.

In one embodiment, the neural network model is further trained to generate a predicted image brand rank. The predicted image brand rank may be output from a different layer or portion of the neural network model than the predicted augmented image brand rank.

In one embodiment, the neural network model is trained to generate predicted image features. The predicted image features may be output from a different layer or portion of the neural network model than the predicted augmented image brand rank.

In one embodiment, the neural network model outputs one or more predicted financial features, predicted image brand ranks, and predicted image features. The neural network model may then be updated using the neural network model outputs, training image features extracted from training image data, image brand model outputs, and augmented image brand model outputs.

Turning to FIG. 2B, the process (250) may execute on a server as part of a training application and a server application. At Step 252, a financial brand model is trained, with financial features extracted from training financial data, to generate a financial brand rank from financial features extracted from financial data. In one embodiment, the financial brand model is updated using financial brand model outputs and financial ranks. The financial brand model may be updated with an update function.

At Step 254, a combined model is trained to generate a combined brand rank from financial features extracted from financial data and the image features extracted from image data. In one embodiment, the combined model is updated using combined model outputs and financial ranks.

At Step 256, a neural network model is trained to generate predicted augmented image brand ranks, augmented image brand ranks, and predicted image features from predicted financial features. In one embodiment, separate neural networks may be used to generate the outputs of the neural network model.

At Step 258, recommendations are generated, with a recommendation engine, from image data using a machine learning model that includes the neural network model. In one embodiment a recommendation identifies an image parameter to adjust to improve the predicted augmented image brand rank. In one embodiment, a recommendation includes an offer term based on the predicted augmented image brand rank.

At Step 260, the recommendations are presented to a client device. The recommendations may be presented by updating dynamic content (e.g., a web page) on the client device, transferring a new web page with the updated content to the client device, pushing notifications to the client device, etc. After receiving the updates, the client device renders and displays the updates.

Figure 3A:
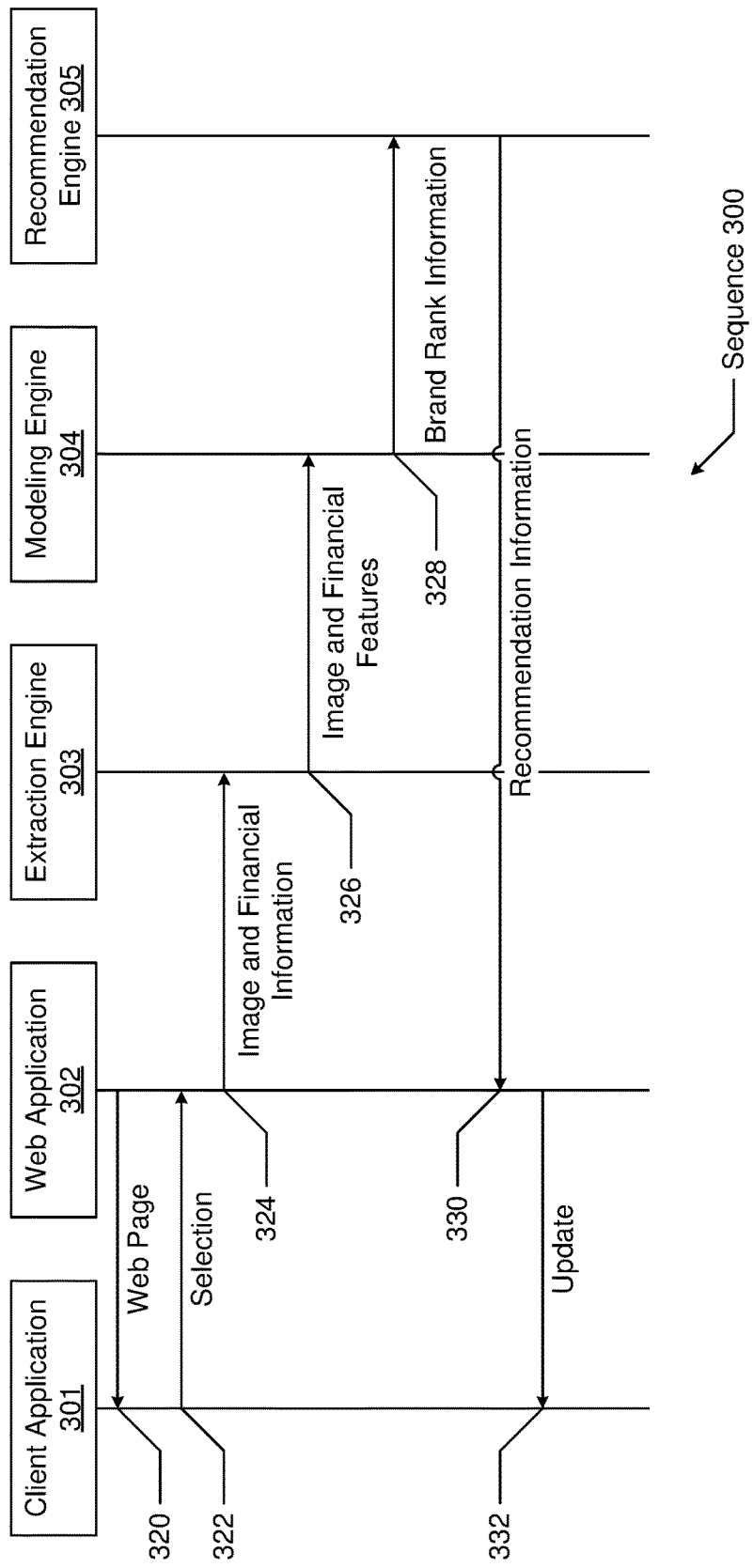
FIG. 3A, FIG. 3B, and FIG. 3C show examples in accordance with disclosed embodiments.
Figure 3B:
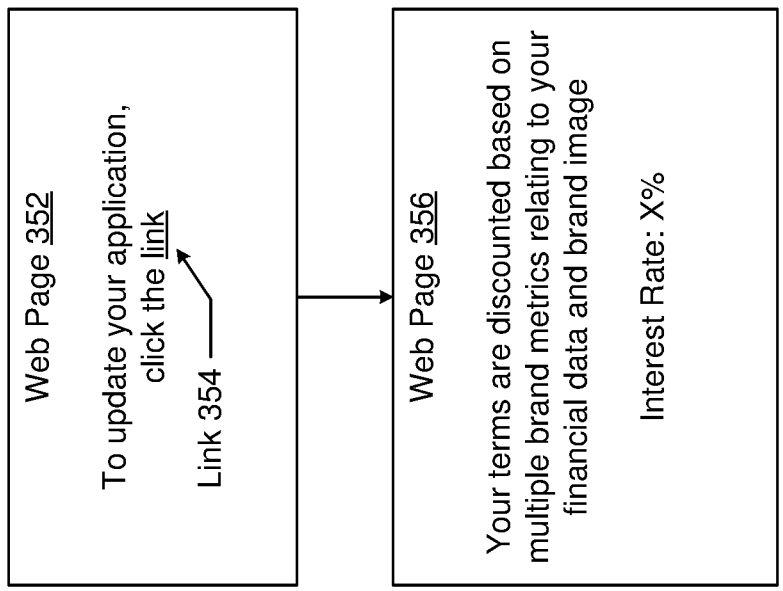
Figure 3C:
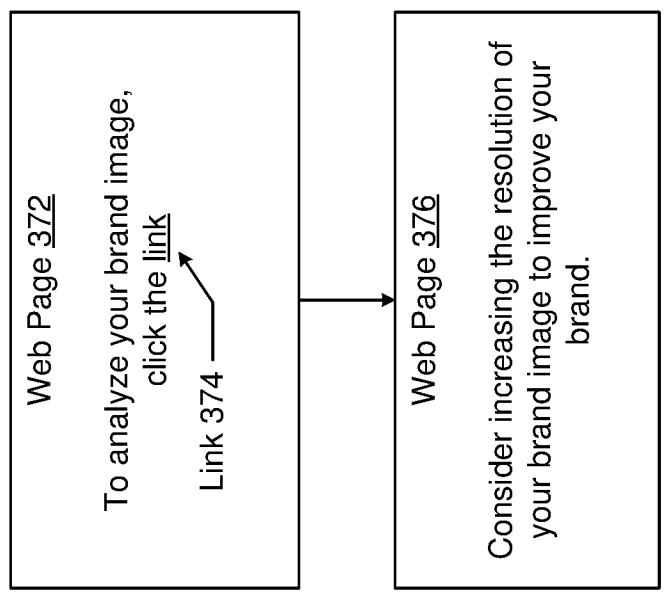

FIGS. 3A, 3B, and 3C show an example of sequences and web pages in accordance with the disclosure. FIG. 3A shows a sequence of using the machine learning model to generate recommendations that are presented as updates to a user. FIGS. 3B and 3C show examples of websites that use machine learning models. The embodiments of FIGS. 3A, 3B, and 3C may be combined and may include or be included within the features and embodiments described in the other figures of the application. The features and elements of FIGS. 3A, 3B, and 3C are, individually and as a combination, improvements to the technology of computing systems and machine learning systems. The various features, elements, widgets, components, and interfaces shown in FIGS. 3A, 3B, and 3C may be omitted, repeated, combined, and/or altered as shown. Accordingly, the scope of the present disclosure should not be considered limited to the specific arrangements shown in FIGS. 3A, 3B, and 3C.

Turning to FIG. 3A, the sequence (300) generates and presents recommendations. The sequence (300) may execute on client device and a server with the client device executing the client application (301) and the server hosting the web application (302), the extraction engine (303), the modeling engine (304), and the recommendation engine (305). The web application (302) is a server application that communicates with the client application using web pages. In one embodiment, the client application (301) is a web browser that displays information from the web application (302).

At Step 320, a web page is served from the web application (302) to the client application (301). In one embodiment, the web page may be used to initiate evaluation of an image to identify the brand rank of the image and suggest improvements to the image. In one embodiment, the web page may be an application for a loan that includes a term based on the brand rank of an image uploaded by the user.

At Step 322, a selection from the web page is transmitted from the client application (301) to the web application (302). In one embodiment, the selection forms part of a request to generate a recommendation based on the brand rank of an image supplied by the user with the client application (301). In one embodiment, the selection may include the image.

At Step 324, financial and image information is transmitted to the extraction engine (303). The financial and image information may include financial and image data retrieved from a repository in response to the selection that was received from the client application (301).

After receiving the image and financial information, the extraction engine (303) extracts image features and financial features from the image data and financial data that make up the image and financial information received by the extraction engine (303). The financial features may include metrics related to transactions (transaction volume, transaction size, etc.), financial ratios (e.g., return on income), etc. The image features may include metadata and metrics about an image, including values for the file type of the image, the percentage of the primary color used in the image, the resolution of the image, etc.

At Step 326, image and financial features that were extracted by the extraction engine (303) are sent to the modeling engine (304). The modeling engine (304) uses multiple machine learning models to generate brand rank information as outputs from the image and financial features. The brand rank information may include a financial brand rank from a financial brand model, an image brand rank from an image brand model, a combined brand rank from a combined model, an augmented image brand rank from an augmented image brand model, and a predicted augmented image brand rank from a neural network model.

At Step 328, brand rank information generated by the modeling engine (304) is sent to the recommendation engine (305). After receiving the brand rank information, the recommendation engine (305) generates recommendation information. In one embodiment, the recommendation information includes a financial recommendation to adjust a term of a financial product. In one embodiment, the recommendation information includes an image recommendation to make an adjustment to an image to increase the image brand rank of the image.

At Step 330, recommendation information generated by the recommendation engine (305) is sent to the web application (302). The web application (302) generates an update using the recommendation information. In one embodiment, the update includes dynamic content updates to the web page previously sent to the client application (301). In one embodiment, the update is a new web page accessed from the web page previously sent to client application (301).

At Step 332, an update is sent from the web application (302) to the client application (301). After receiving the update, the client application (301) renders and displays the update.

Turning to FIG. 3B example web pages (352) and (356) are shown. Web page (352) includes the link (354) that, when selected, triggers an update to a server application. After the link is selected, the server application uses the machine learning models to generate a financial recommendation that is presented in the web page (356). The interest rate displayed in the web page (356) may be based on the recommendation generated with the machine learning models. For example, when the image brand rank of an image provided as part of the application ranks a standard deviation above the mean image brand rank for a group of business entities, the interest rate may be discounted a fixed or variable amount. The variable amount may be proportional to the number of standard deviations that the image brand rank for the application is away from the mean image brand rank for the group of business entities.

Turning to FIG. 3C, example web pages (372) and (376) are shown. Web page (372) includes the link (374). After the link (374) is selected, a brand image is uploaded to a server that analyzes the brand image with machine learning models to generate a recommendation to improve the brand image. The recommendation is presented in the web page (376).

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and 408) may be locally or remotely connected to the computer processor(s) (402), non-persistent storage (404), and persistent storage (406). Many different types of computing systems exist, and the aforementioned input and output device(s) (410 and 408) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
training an image brand model to generate an image brand rank from image features;
training an augmented image brand model to generate an augmented image brand rank from the image brand rank;
generating predicted financial features from the augmented image brand rank using a feature generation model; and
training a neural network model to generate a predicted augmented image brand rank from the predicted financial features.

2. The method of claim 1, further comprising:
generating, with a recommendation engine, a recommendation from image data using a machine learning model that includes the neural network model, wherein the recommendation identifies an image parameter to adjust to improve the predicted augmented image brand rank; and
presenting the recommendation to a client device.

3. The method of claim 1, further comprising:
generating, with a recommendation engine, a recommendation from image data using a machine learning model that includes the neural network model, wherein the recommendation includes an offer term based on the predicted augmented image brand rank; and
presenting the recommendation to a client device.

4. The method of claim 1, further comprising:
training, with financial features extracted from training financial data, a financial brand model to generate a financial brand rank from financial features extracted from financial data; and
updating the financial brand model using financial brand model outputs and financial ranks.

5. The method of claim 4, further comprising:
updating the image brand model using image brand model outputs and the financial brand model outputs.

6. The method of claim 1, further comprising:
training a combined model to generate a combined brand rank from financial features extracted from financial data and the image features extracted from image data; and
updating the combined model using combined model outputs and financial ranks.

7. The method of claim 6, further comprising:
updating the augmented image brand model using augmented image brand model outputs and the combined model outputs.

8. The method of claim 1, further comprising:
updating the feature generation model using feature generation model outputs and training financial features extracted from training financial data.

9. The method of claim 1, further comprising:
training the neural network model to generate a predicted image brand rank; and
training the neural network model to generate predicted image features.

10. The method of claim 9, further comprising:
updating the neural network model using neural network model outputs, training image features extracted from training image data, image brand model outputs, and augmented image brand model outputs.

11. A system comprising:
one or more processors;
one or more memories;
a training application stored on the one or more memories, executing on the one or more processors, and configured for:
  training an image brand model to generate an image brand rank from image features,
  training an augmented image brand model to generate an augmented image brand rank from the image brand rank,
  generating predicted financial features from the augmented image brand rank using a feature generation model, and
  training a neural network model to generate a predicted augmented image brand rank from the predicted financial features; and
a server application stored on the one or more memories, executing on the one or more processors, and configured for:
  generating, with a recommendation engine, a recommendation from image data using a machine learning model that includes the neural network model, and
  presenting the recommendation to a client device.

12. The system of claim 11, wherein the recommendation identifies an image parameter to adjust to improve the predicted augmented image brand rank.

13. The system of claim 11, wherein the recommendation includes an offer term based on the predicted augmented image brand rank.

14. The system of claim 11, wherein the training application is further configured for:
  training, with financial features extracted from training financial data, a financial brand model to generate a financial brand rank from financial features extracted from financial data; and
  updating the financial brand model using financial brand model outputs and financial ranks.

15. The system of claim 14, wherein the training application is further configured for:
  updating the image brand model using image brand model outputs and the financial brand model outputs.

16. The system of claim 11, wherein the training application is further configured for:
  training a combined model to generate a combined brand rank from financial features extracted from financial data and the image features extracted from image data; and
  updating the combined model using combined model outputs and financial ranks.

17. The system of claim 16, further comprising:
updating the augmented image brand model using augmented image brand model outputs and the combined model outputs.

18. The system of claim 11, wherein the training application is further configured for:
  updating the feature generation model using feature generation model outputs and training financial features extracted from training financial data.

19. The system of claim 11, wherein the training application is further configured for:
  training the neural network model to generate a predicted image brand rank;
  training the neural network model to generate predicted image features; and
  updating the neural network model using neural network model outputs, training image features extracted from training image data, image brand model outputs, and augmented image brand model outputs.

20. A method comprising:
generating predicted financial features from an augmented image brand rank using a feature generation model;
training a neural network model to generate a predicted augmented image brand rank from the predicted financial features;
generating, with a recommendation engine, a recommendation from image data using a machine learning model that includes the neural network model; and
presenting the recommendation to a client device.

* * * * *